United States Patent [19]

Mertz et al.

[11] Patent Number: 4,751,605
[45] Date of Patent: Jun. 14, 1988

[54] READER FOR A DIGITAL TRIP DEVICE ASSOCIATED WITH A CURRENT BREAKING DEVICE

[75] Inventors: Jean-Luc Mertz, Grenoble; Yves Blain, Uriage, both of France

[73] Assignee: Merlin Gerin, France

[21] Appl. No.: 948,114

[22] Filed: Dec. 29, 1986

[30] Foreign Application Priority Data

Jan. 3, 1986 [FR] France .................. 8600110

[51] Int. Cl.$^4$ .................. H02H 3/00
[52] U.S. Cl. .................. 361/91; 361/93; 307/140; 340/870.29
[58] Field of Search .................. 361/23, 91, 96, 97, 361/391, 392; 307/140; 340/870.29, 662, 706, 711

[56] References Cited

U.S. PATENT DOCUMENTS

| | | | |
|---|---|---|---|
| 4,119,948 | 10/1978 | Ward et al. | 340/870.29 X |
| 4,358,810 | 11/1982 | Wafer et al. | 361/93 |
| 4,429,340 | 1/1984 | Howell | 361/96 |
| 4,470,092 | 9/1984 | Lombardi | 361/23 |
| 4,600,918 | 7/1986 | Belisomi et al. | 340/711 |
| 4,652,769 | 3/1987 | Smith et al. | 307/31 |

FOREIGN PATENT DOCUMENTS 2531239  7/1983  France .

Primary Examiner—A. D. Pellinen
Assistant Examiner—Todd E. DeBoer
Attorney, Agent, or Firm—Parkhurst & Oliff

[57] ABSTRACT

The present invention relates to a display device for a digital trip device associated with a current breaking device. The trip device comprises apparatus for entering operating parameters and apparatus for measuring the current in the breaking device, these two apparatuses being coupled with a first microprocessor comprising memory areas in which the parameters and measurement data are entered. The display device is of the portable type, able to be coupled temporarily with the trip device, and comprises: an alphanumerical display, a second microprocessor comprising memory areas, apparatus associable with complementary apparatus in the trip device to transfer the contents of the memory areas of the trip device to the memory areas of the display device, these contents then being able to be displayed selectively by the reader during or after the temporary coupling.

5 Claims, 4 Drawing Sheets

READER FOR A DIGITAL TRIP DEVICE ASSOCIATED WITH A CURRENT BREAKING DEVICE

BACKGROUND OF THE INVENTION

The present invention relates to a reader for a digital trip device associated with a current breaking device.

In the field of current breaking devices, for example circuit breakers for electrical motors, the development of new techniques using microprocessors has led to trip devices being produced which enable the tripping conditions to be accurately determined taking a large number of parameters into account, for example to enable short delay trips, or long delay trips in correspondence with predetermined complex graphs to optimize the operation of the motor and its tripping.

Thus, user demand has led to the appearance of trip devices providing a large number of possibilities and which consequently require in practice the presence of a display means or read-out means to indicate the statuses of the settings made and the currents flowing in the motor power supply, these currents being taken at the level of the circuit breaker.

A drawback to such elaborate trip devices becoming generalized is their relatively high cost. Thus, sophisticated trip devices of this kind are in practice limited to associations with high-power circuit breakers associated with high-power motors, which are therefore expensive, for which it is worthwhile providing a sufficiently elaborate protective device (tripping). For medium power motors, users hesitate to fit themselves with sophisticated trip devices which do not seem sufficiently worthwhile compared to the investment they represent.

An object of the present invention is to enable sophisticated trip devices for circuit breakers to be used, these trip devices providing the functions at present existing for high-power applications but achieved in such a way as to be less expensive.

The initial idea for the present invention results from a cost analysis of the sophisticated digital trip devices available at present. With microprocessors being produced on a very large scale and being easy to program, the latter no longer constitute a determining factor in the cost of a digitial trip device. Paradoxically, the cost of the alphanumerical read-out accounts for a large part of the cost of the trip device.

If, however, this read-out is replaced by a system of indicator lamps or abolished, the trip device is no longer of any great interest to the user. Indeed, to take advantage of everything a sophisticated trip device has to offer, it is necessary to know what settings have been made, and also to be able to accurately detect the currents flowing in the circuit breaker supply lines in normal operation and when a trip occurs.

SUMMARY OF THE INVENTION

To achieve its aim, the present invention separates the reader and trip device functions and organizes the trip device and an independent reader in such a way that they can be associated simply and quickly.

To achieve this objective, the present invention uses a reader for a digital trip device associated with a current breaking device in which the trip device comprises means of entering operating parameters and on-off indicating means, these means being coupled with a first microprocessor comprising memory areas in which said parameters and data characteristic of the current in the breaking device are entered. The reader is of the portable type, able to be coupled temporarily with the trip device, and comprises : an alphanumerical display means, a second microprocessor comprising memory areas, means associable with complementary means in the trip device to transfer the contents of the memory areas of the first microprocessor to the memory areas of the reader, these contents then being able to be displayed selectively by the reader during or after coupling.

According to an embodiment of this reader, coupling is performed without mechanical contact. For example, the reader comprises infra-red radiation receiving means, the receiver comprising complementary infra-red radiation means coupled to its microprocessor.

Thus, according to the present invention, a reader independent from the trip device is achieved, able to be temporarily associated with a trip device and therefore able to be used sequentially in relation with a large number of trip devices, which represents considerable practical advantages, since a single reader can be used for example by a company or a maintenance department to check a large number of trip devices-circuit breakers in different locations.

BRIEF DESCRIPTION OF THE DRAWINGS

Other advantages and characteristics will become more clearly apparent from the following description of an embodiment of the invention, given as an example only, and represented in the accompanying drawings, in which.

DESCRIPTION OF THE PREFERRED EMBODIMENTS

Figure 1:
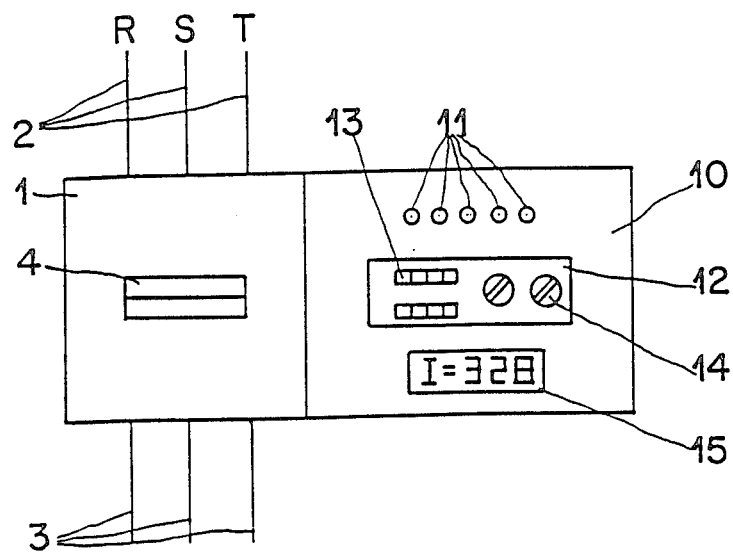
FIG. 1 represents a digital control circuit breaker-trip device according to the prior art.

In FIG. 1, a circuit breaker 1 with an operating handle 4 is inserted in an electrical distribution circuit having three phase conductors RST, input 2 to and output 3 from the circuit breaker. The circuit breaker mechanism is controlled by a microprocessor-based digital solid-state trip device 10, this microprocessor itself comprising a central unit, a RAM area, a ROM area, and the other usual resources of a microprocessor. Only some of the conventional microprocessor access means and means of reading the information supplied by the latter are represented in FIG. 1. The microprocessor is sensitive both to these access means and to the signals from the sensors associated with the circuit breaker 1, and enables the currents at a given time in the conductors connected to the circuit breaker and the currents present in these conductors when a trip occurred to be stored in memory, thus enabling the cause and type of this trip to be determined.

Thus, the front panel of the trip device 10 typically comprises a set of indicator lamps 11 each of which is designed to indicate the circuit breaker operating mode (closed state or open state) and, in case of the circuit breaker opening, the reason for tripping (for example, short delay, long delay, earth leakage phase fault). The trip device also comprises an alphanumerical read-out 15 on which the indications stored in the microprocessor RAM can be read, that is to say indicating for example the last current values when a trip occurred or the present current value in the case of normal operation. Finally, the front panel of the trip device comprises a set of actuating means 12, such as selector switches 13 or variable potentiometers 14 for initial programming of the trip device. The readout 15 also enables the setting values to be displayed. This set of access means and display means will be be described in detail here since it is already known in the art.

Figure 2:
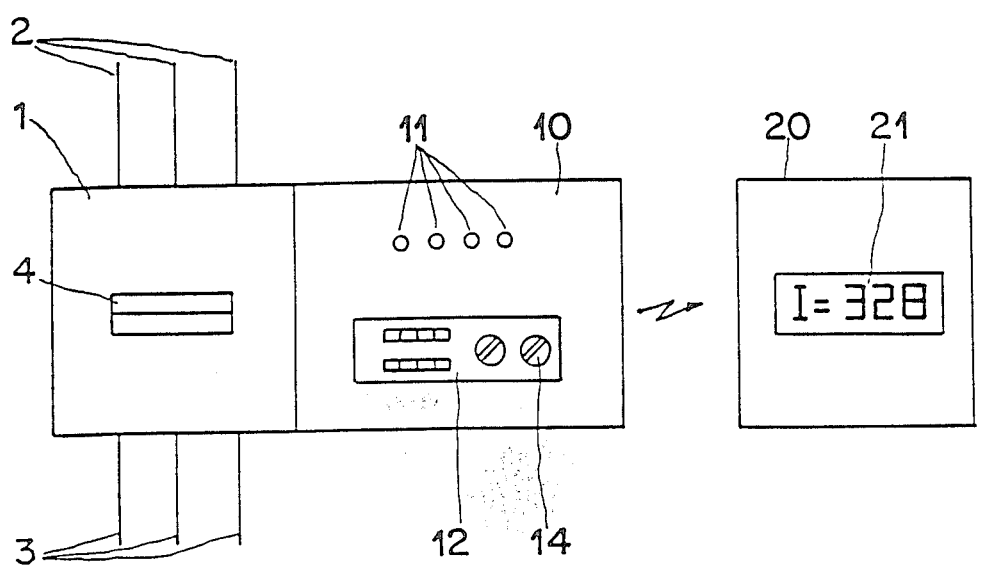
FIG. 2 represents a circuit breaker-trip device associated with a read-out according to the present invention.

FIG. 2 represents a trip device/read-out assembly according to the present invention. The circuit breaker 1 and the trip device 10 in FIG. 1 are represented therein. It should however be noted that the trip device 10 no longer comprises alphanumerical display means. This trip device is moreover modified in a manner which will be described hereafter. This trip device can be associated by any coupling means with or without mechanical contact to a reader 20. This reader 20 essentially comprises an alphanumerical display means 21 on its front panel.

Figure 3:
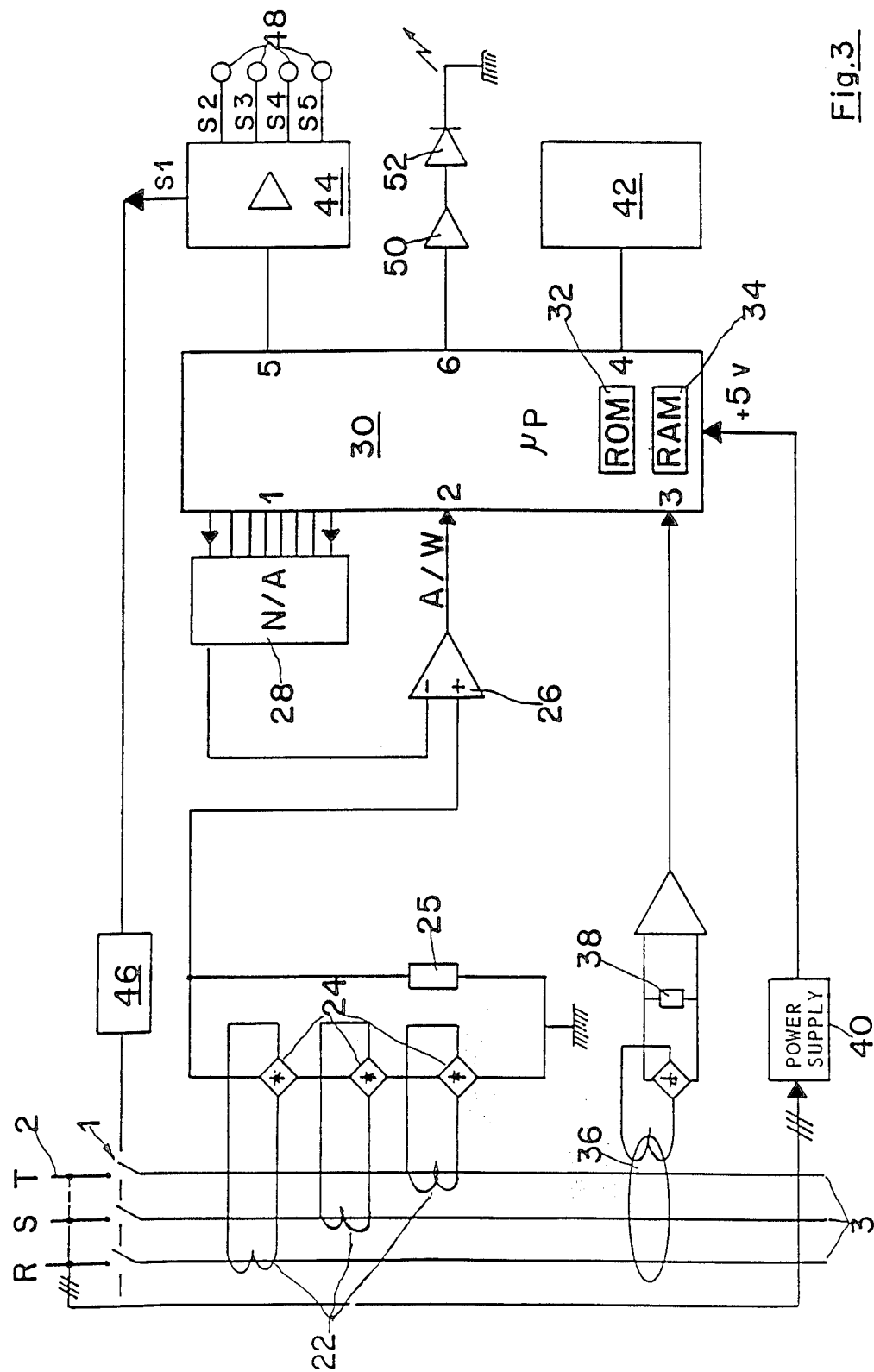
FIG. 3 is the block diagram of the circuit breaker-trip device according to FIG. 2.

Referring more particularly now to FIG. 3, it can be seen that each output phase conductor 3 of the circuit breaker 1 has associated with it a sensor 22 which delivers a signal proportional to the current flowing through the associated conductor, the signal being applied to a full-wave rectifier bridge 24. The outputs of the three bridges 24 are connected in series in a circuit comprising a measuring resistor 25 to provide at the resistor terminals a voltage signal proportional to the maximum current value. The voltage signal is applied to one of the inputs of a comparator 26, the other input of which receives a signal from a digital-to-analog converter 28 connected to a set of outputs (8 for example) 1 of a microprocessor 30. The output of the comparator 26 is connected to an input 2 of the microprocessor 30. The microprocessor sends via the converter 28 to the input of the comparator 26 successive values to which the signal representative of the current applied to the other input is compared. By detecting the equality of the values applied to the inputs of the comparator 26 and by successive approaches, the microprocessor 30 determines the phase current value. The converter 28 can be achieved simply by N resistors.

The microprocessor 30, for example mode 7508 from the NEC Company, contains standard resources, such as the processing unit, ROM 32, RAM 34, calculation unit and input-output interfaces.

An earth leakage fault signal, delivered by an earth leakage transformer 36 and processed in a threshold circuit 38, is applied to an input 3 of the microprocessor 30. A power supply unit 40, connected to the phase conductors RST, supplies the electronic circuits. The tripping parameters are supplied to the microprocessor 30 by programming or by a setting unit 42 connected to an input 4. An output register 44 is connected to an output 5 of the microprocessor 30 for transmission on a channel S1 of a tripping order to a relay 46 and on four signalling channels S2-S5 to a light-emitting diode display unit 48. An output 6 of the microprocessor 30 supplies a remote transmission photo-emitting diode 52 via a processing unit 50.

Figure 5:
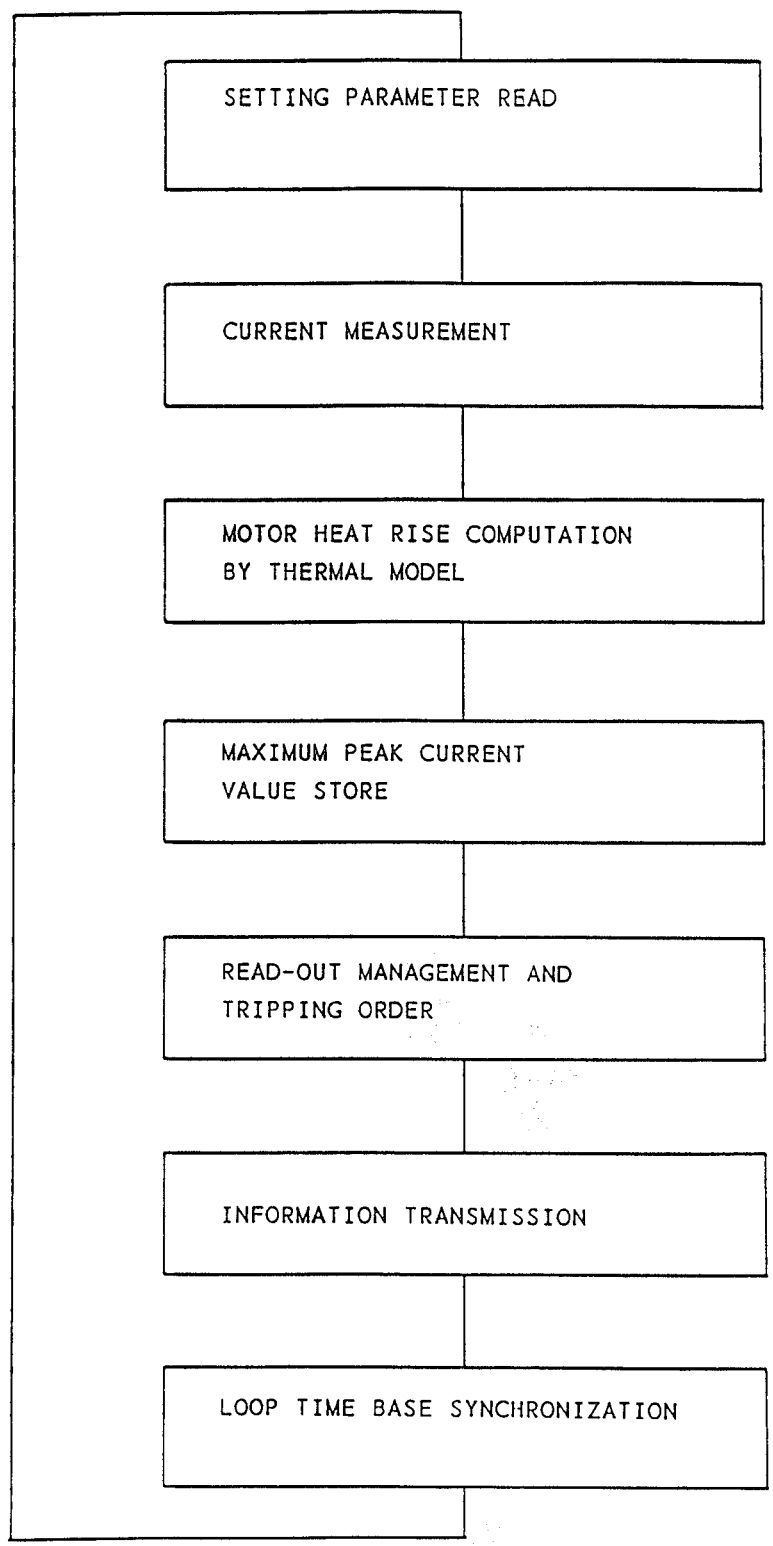
FIG. 5 is the flow chart of the general tripping function.

General operation of the solid-state trip device can be understood from the program illustrated by FIG. 5.

The microprocessor 30 collects the setting parameters entered via the setting unit 42 and reads the value of the phase current applied to the input 2. It calculates the heat rise of the protected equipment, for example the motor, by a thermal model and, by comparing with the setting thresholds, notably the long delay and short delay trip thresholds, emits a tripping order on output 5 transmitted to the relay 46 which causes the circuit breaker contacts to open. The maximum peak current value is stored. The output 5 transmits the information to the diodes 48 which indicate the type of trip performed. This information is also stored in the RAM 34. The cycle includes transmission of the information stored in the RAM 34 and/or ROM 32 to a reader by emission of infra-red signals by the diode 52.

When an earth leakage fault is transmitted to the input 3 of the microprocessor, the latter generates a tripping order with corresponding display by the diodes 48.

It is clear that the microprocessor can perform other functions and that the processing circuits can be different.

The trip device 10 comprises coding means of the signals stored in its RAM 34 (these means can be simply achieved in software form) and transmission means of these coded signals to a receiver means included in the reader 20, this receiver means itself being associated with a decoder connected to a microprocessor provided in the reader 20. According to one feature of the present invention, the reader 20 comprises the same microprocessor as the trip device 10. The contents of the trip device RAM can thus be simply transferred to the reader microprocessor RAM, both these microprocessors being organized in the same way.

Thus, according to the present invention, all the data contained in the first microprocessor RAM (that of the trip device) can be transferred to the second microprocessor (that of the reader), to be displayed on the read-out.

Figure 4:
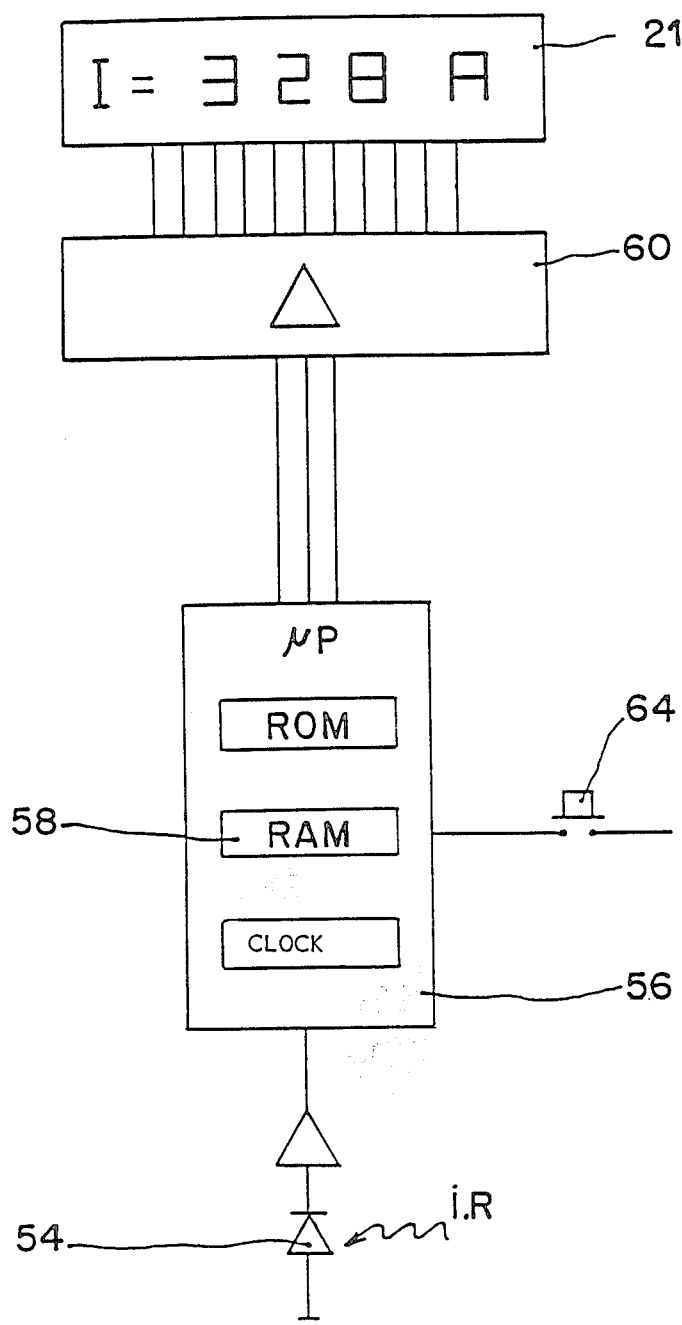
FIG. 4 is the block diagram of the reader according to FIG. 2.

Referring now to FIG. 4, it can be seen that the reader comprises a photo-receiver diode 54 receiving the signal emitted by the photo-emitting diode 52. The signal received is amplified and transmitted to a microprocessor 56, having a RAM 58 which stores the transmitted information. An output of the microprocessor 56 is connected by a register 60 to an alpha-numerical display unit 21, for example a three-digits display. A control signal, notably by push-button 64, is applied to an input of the microprocessor 56 to control the display cycle which may comprise successive display of the setting values, the maximum currents, the tripping values and types, and such like.

An assembly comprising a photo-emitting diode associated with the trip device and a photo-receiver diode associated with the reader can be selected as the coupling means between the trip device and the reader, these diodes being preferably active in the infra-red spectrum field to avoid the photo-receiver diode being activated by interference from ambient lighting.

If simple, inexpensive microprocessore are chosen for the trip device and for the reader, for example microprocessors organized in 4-bit words, each word corresponds to a decimal value comprised between 0 and 15. A simple coding method consists in converting the contents of each memory cell, i.e. of each word, into a succession of pulses corresponding to the decimal avlue of this word, i.e. a sequence of a certain number of puses comprised for example between 1 and 16. This sequence of pulses can be sent to the photo-emitter at a relatively fast rate, for example by choosing pulses with a width of 30 microseconds separated by intervals of 200 microseconds. The interval between each pulse train may be in the order of one hundred milliseconds. It can be arranged that recording can only begin in the reader when the latter has detected a succession of predetermined pulses, for example a sequence of more than 16 pulses. A worthwhile reason for arranging long time intervals between the pulse trains is to allow the trip device microprocessor to continue carrying out the tasks allocated to it during these intervals.

Coding and decoding means of this kind are well known in the art.

Thus, the reader according to the present invention can be used to proceed with the initial trip device settings, by reading on the display the set-point values entered by means of the switches or other control means of this trip device. The reader can also be used, if trips occure repetitively and are a cause for alarm, to determine the conditions prevailing at circuit breaker level when the latter trips. Readers of this kind can be used by maintenance departments internal or external to the company using for example motors protected by circuit breaker-trip device assemblies.

According to an alternative embodiment of the present invention, the possibility is provided for the reader to be coupled successively to several trip devices controlling distinct units to record in the memory the set-point values and operating paramemters of each of the trip devices for subsequent analysis of the data collected outside the machine room. The reader preferably includes an autonomous power supply.

What we claim is:

1. A display device used with a circuit breaker having a digital solid-state trip unit, the trip unit being fixed to the circuit breaker and comprising entering means for entering operating parameters, current measuring means, a first microprocessor coupled to said entering and measuring means and arranged to send a tripping order to said circuit breaker upon occurrence of an overload or a fault, on-off display means located in the trip unit for indicating the causes of a trip, said first microprocessor comprising first memory areas in which said parameters and current measurement data are stored, the display device being portable and capable of being coupled temporarily with the trip unit without mechanical contact, and comprising:

a second microprocessor including second memory areas, alphanumerical display means coupled with the second microprocessor, and transmission means coupled with the second microprocessor for communicating with complementary transmission means with the trip unit coupled with the first microprocessor, to transfer the contents of the first memory areas to the second memory areas for selective display of the contents on said alphanumerical display means during or after temporary coupling of the display device to the trip unit, whereby said display device can be coupled selectively with different trip units.

2. A display device according to claim 1, wherein the transmission means coupled with the second microprocessor comprise infra-red radition receiving means, and the transmission means coupled with the first microprocessor comprise complementary infra-red radiation emitting means.

3. A display device according to claim 1, wherein said first and second microprocessors are identical.

4. A display device according to claim 1, wherein said on-off display means comprise light-emitting diodes.

5. A display device according to claim 1, further comprising an autonomous power supply.

* * * * *